(12) United States Patent
Shields

(10) Patent No.: US 10,574,538 B1
(45) Date of Patent: Feb. 25, 2020

(54) NETWORK VISUALIZATION USER INTERFACE

(71) Applicant: Amazon Technologies, Inc., Seattle, WA (US)

(72) Inventor: Dylan Shields, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 15/959,056

(22) Filed: Apr. 20, 2018

(51) Int. Cl.
*H04L 12/24* (2006.01)
*G06F 3/0484* (2013.01)

(52) U.S. Cl.
CPC .............. *H04L 41/22* (2013.01); *H04L 41/12* (2013.01); *G06F 3/04842* (2013.01)

(58) Field of Classification Search
CPC ....................................................... H04L 41/22
See application file for complete search history.

(56) References Cited

U.S. PATENT DOCUMENTS

| | | | | |
|---|---|---|---|---|
| 2004/0196308 A1* | 10/2004 | Blomquist | .............. | H04L 41/22 715/734 |
| 2007/0204231 A1* | 8/2007 | Cunningham | .......... | H04L 41/12 715/734 |
| 2018/0046690 A1* | 2/2018 | Keahey | ................... | G06F 16/26 |
| 2019/0104343 A1* | 4/2019 | Tsivin | ................ | G06Q 30/0201 |

OTHER PUBLICATIONS

Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.

(Continued)

*Primary Examiner* — Nicholas P Celani
(74) *Attorney, Agent, or Firm* — Davis Wright Tremaine LLP

(57) ABSTRACT

A user interface is provided that displays hierarchical and/or relational information, such as information related to the topology of a computer network. The user interface provides a set of enclosed shapes arranged to present a set of nested regions to a network administrator. Each nested region represents a level of a hierarchy, and each region is segmented to represent individual elements within the hierarchy level. In one embodiment, the outmost ring is segmented to represent various networks. The middle ring is segmented to represent various subnets, with the arc of each network segmented to represent one or more subnets associated with a corresponding network. The innermost ring includes elements that represent individual data element. Connections between data elements are shown with lines extending across a shared interior region. In various embodiments, the lines may be given colors, animations, or patterns to indicate various properties of a relationship.

20 Claims, 9 Drawing Sheets

(56) References Cited

OTHER PUBLICATIONS

Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., and R. Atkinson, "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of Seed Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.

(56) References Cited

OTHER PUBLICATIONS

Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, D., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Igoe, K., and D. Stebila, "X.509v3 Certificates for Secure Shell Authentication," Request for Comments: 6187, Standards Track, Mar. 2011, 17 pages.
Kim, W., et al., "Addition of the ARIA Cipher Suites to Transport Layer Security (TLS)," Request for Comments: 6209, Informational, Apr. 2011, 10 pages.
Igoe, K., "Suite B Cryptographic Suites for Secure Shell (SSH)," Request for Comments: 6239, Informational, May 2011, 15 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
McGrew, D., and D. Bailey, "AES-CCM Cipher Suites for Transport Layer Security (TLS)," Request for Comments: 6655, Standards Track, Jul. 2012, 8 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
"Creating a Network Visualization," Microstrategy.com <http://www2.microstrategy.com/producthelp/10/WebUser/WebHelp/Lang_1033/creating_a_network_visualization_html5.htm>, accessed Apr. 20, 2018, 2 pages.
"D3.js," Wikipedia.org, <https://en.wikipedia.org/wiki/D3.js>, edited Apr. 11, 2018, 7 pages.
"Network Mapping Software:: Op Manager," © 2018 Zoho Corp. <https://www.manageengine.com/network-monitoring/network-mapping.html?gclid=EAIaIQobChMI5eXEkLnJ2gIVjDuBCh3cyw9JEAAYASAAEgJs0PD_BwE>, accessed Apr. 20, 2018, 7 pages.

* cited by examiner

NETWORK VISUALIZATION USER INTERFACE

BACKGROUND

Modern computing environments can be very complex, involving many different computer systems and devices interconnected by various subnets, virtual networks, and gateways. As the size and complexity of a computing environment increases, management of the network can become increasingly difficult. In order to aid network administrators, a variety of tools have been created that harvest network information and then present the information to the network administrator. Some tools provide a text output describing connection performance, address resolution information, or name resolution parameters. Other tools produce graphical output showing various representations of network topology. For large networks, the amount of information presented in any interface can quickly become overwhelming, making it difficult for an administrator to discern important data and connections from the jumbled display. Providing an interface that is able to organize and clearly display large amounts of networking information is an important problem.

BRIEF DESCRIPTION OF THE DRAWINGS

Various techniques will be described with reference to the drawings, in which.

DETAILED DESCRIPTION

Figure 1:
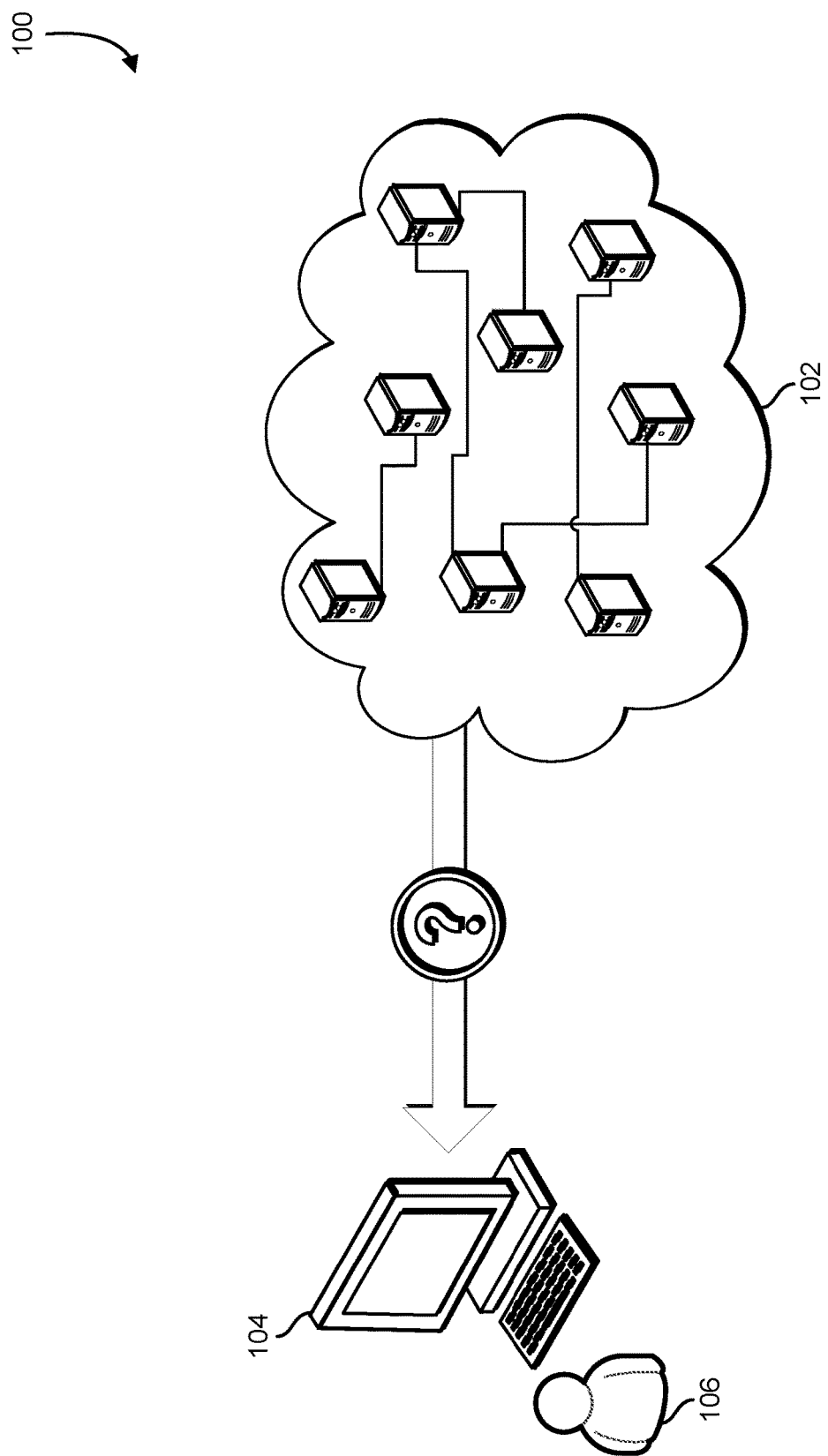
FIG. 1 shows an illustrative example of a network of computer systems and an administrative console used by a network administrator, in an embodiment.

The present document describes a system that provides a graphical user interface ("GUI") which shows the hierarchical and relational connectivity between a collection of network nodes. The graphical user interface includes a set of concentric rings, where each ring in the set of concentric rings represents a different level of topographical information. In an embodiment, the user interface includes three concentric rings where the innermost concentric ring displays information associated with individual network nodes, the middle concentric ring displays information associated with individual network subnets, and the outermost concentric ring displays information associated with individual networks. Inside the innermost ring is a shared interior region in which connections between individual network nodes are represented. In some embodiments, connections between individual network nodes are represented with a line, elliptical arc, or other connection between two nodes. In some embodiments, properties of an individual connection may be represented by applying a particular color, pattern, or animation to the connection.

In an embodiment, the user is able to select individual network nodes that are presented by the graphical user interface. If an individual network node is selected, the system identifies the set of additional network nodes with which the selected individual network node is able to communicate. Communication links between the selected node and the set of additional network nodes are displayed in the shared interior region. In various examples, particular colors, patterns, or animations may be applied to individual communication links to indicate various protocols, connection characteristics, or properties of each link. Other communication links that do not involve the selected network node are removed from the shared interior region to improve the visibility of the remaining links. In some examples, only the selected node in the set of additional network nodes is displayed in the innermost ring, and other nodes are removed to provide increased clarity.

When a particular network node is selected by the user, the system may present a dialog box that displays properties of the selected node. In an embodiment, the dialog displays the hostname, network address, subnet, and network of the selected node. In some examples, additional information associated with the selected node is displayed. In one example, the dialog displays security events associated with the selected node. In another example, the dialog displays networking events associated with the selected node. In yet another example, the dialog displays diagnostic events associated with the selected node. In some embodiments, the dialog box may provide a hyperlink to additional detail related to security events, network events, or diagnostic events. In some implementations, the user may be allowed to select a plurality of network nodes, and the user interface limits the display to links involving any of the selected plurality of nodes.

In an embodiment, the graphical user interface allows the user to select a set of subnets and networks to be displayed. In one implementation, the user is able to select one or more subnets for display from the subnets displayed in the middle ring of the graphical user interface. In one embodiment, clicking on the region of the middle ring associated with a particular subnet causes the particular subnet and network nodes associated with a particular subnet to be removed from the graphical user interface. Upon removing the particular subnet, the remaining subnets and network nodes are redistributed around the circumference of the display, and network connections to the removed network nodes are removed from the shared interior region, producing a less cluttered display. In another embodiment, clicking on a network in the outer ring of the graphical user interface removes the network, its associated subnets, and its associated network nodes from the display. Subnets and networks that are removed from the display may be moved to a status bar or dialog from which the user may select the removed subnets or networks to return them to the user interface.

The user interface described herein may be used in various embodiments to display hierarchical and/or relational data. The term hierarchical may be interpreted to describe nodes that have up to one incoming connection, and any number of outgoing connections, and that the data is cycle-free. An example of hierarchical data would be an employee org chart. In an employee org chart, each employee has up to one incoming connection (from their manager to them), and any number of outgoing connections (from them to their direct reports). The term relational may be used to describe nodes that have any number of connections to other nodes, and that those connections may or may not be labelled, weighted, or directed. An example of this would be a social network that creates a connection between every pair of friends. Various embodiments of the graphical user interface described herein are able to show both relational and hierarchical aspects of data in a single diagram.

FIG. 1 shows an illustrative example of a network of computer systems and an administrative console used by a network administrator, in an embodiment. An environment 100 includes a network of computer systems 102 connected to an administrative console 104 operated by a network administrator 106. The network of computer systems 102 includes a plurality of interconnected computer systems. The computer systems may include various computing resources such as server computer systems, client computer systems, network appliances, network routers, network switches, network-connected appliances, laptop computers, wireless devices, cellular devices, virtual computer systems, and network-connected wearable devices. The network may be constructed using a combination of wired and wireless technologies and may be organized as a set of networks, subnetworks, and network nodes using one or more network routers, firewalls, and switches. Some or all of the network may be implemented using virtual networking technologies including but not limited to virtual routers, virtual firewalls, virtual subnets, virtual private networks ("VPN"), and virtual networks. In some embodiments, the network may include resources arranged in one or more virtual private clouds ("VPC").

The administrative console 104, in an embodiment, is a computing device that includes a display that is observable by the network administrator 106. In various embodiments, the administrative console 104 is a client computer system, personal computer, laptop computer, tablet device, cellular phones, handheld device, or network-connected appliance having one or more processors and memory containing instructions that, as a result of being executed by the one or more processors, implements a network-monitoring application. The display on the administrative console 104 may be a cathode ray tube ("CRT"), organic light emitting diode ("OLED"), light emitting diode ("LED"), plasma, liquid crystal, or other visual display device in communication with the administrative console 104. In some examples, the administrative console 104 includes an input device such as a mouse, touchscreen, keyboard, or trackball that allows the network administrator 106 to interact with the network-monitoring application. In some examples, the administrative console 104 includes a voice interface comprised of a microphone and a speaker that allows the network administrator 106 to control the network-monitoring application via voice control.

The network-monitoring application is a set of computer-executable instructions stored in memory on the administrative console 104. As a result of being executed by a processor on the administrative console 104, the computer-executable instructions cause the administrative console 104 to perform various operations including the display and operation of a user interface. Other implementations of the administrative console 104 are possible including those shown in FIG. 9 and the associated description.

The network-monitoring application acquires information that describes the state and configuration of the network of computer systems 102 and presents the information to the network administrator 106 on the administrative console 104. In some examples, the network-monitoring application acquires the information by performing simple network management protocol ("SNMP") queries to one or more devices in the network of computer systems 102. In another example, information is provided to the network-monitoring application from firewalls, applications, and monitoring agents deployed throughout the network of computer systems 102.

In various embodiments, the network-monitoring application synthesizes the information into a format that allows the network administrator 106 to visualize the state and configuration of the network of computer systems 102. In one implementation, the network-monitoring application presents a display that represents the communication links between individual network nodes in the computer network. In another implementation, the network-monitoring application presents a display that allows the network administrator 106 to view the status of individual network nodes in the network of computer systems 102. In yet another implementation, the network-monitoring application enhances the clarity of the displayed information by configuring the display to focus on a particular subset of network nodes, network subnets, and VPCs.

Figure 2:
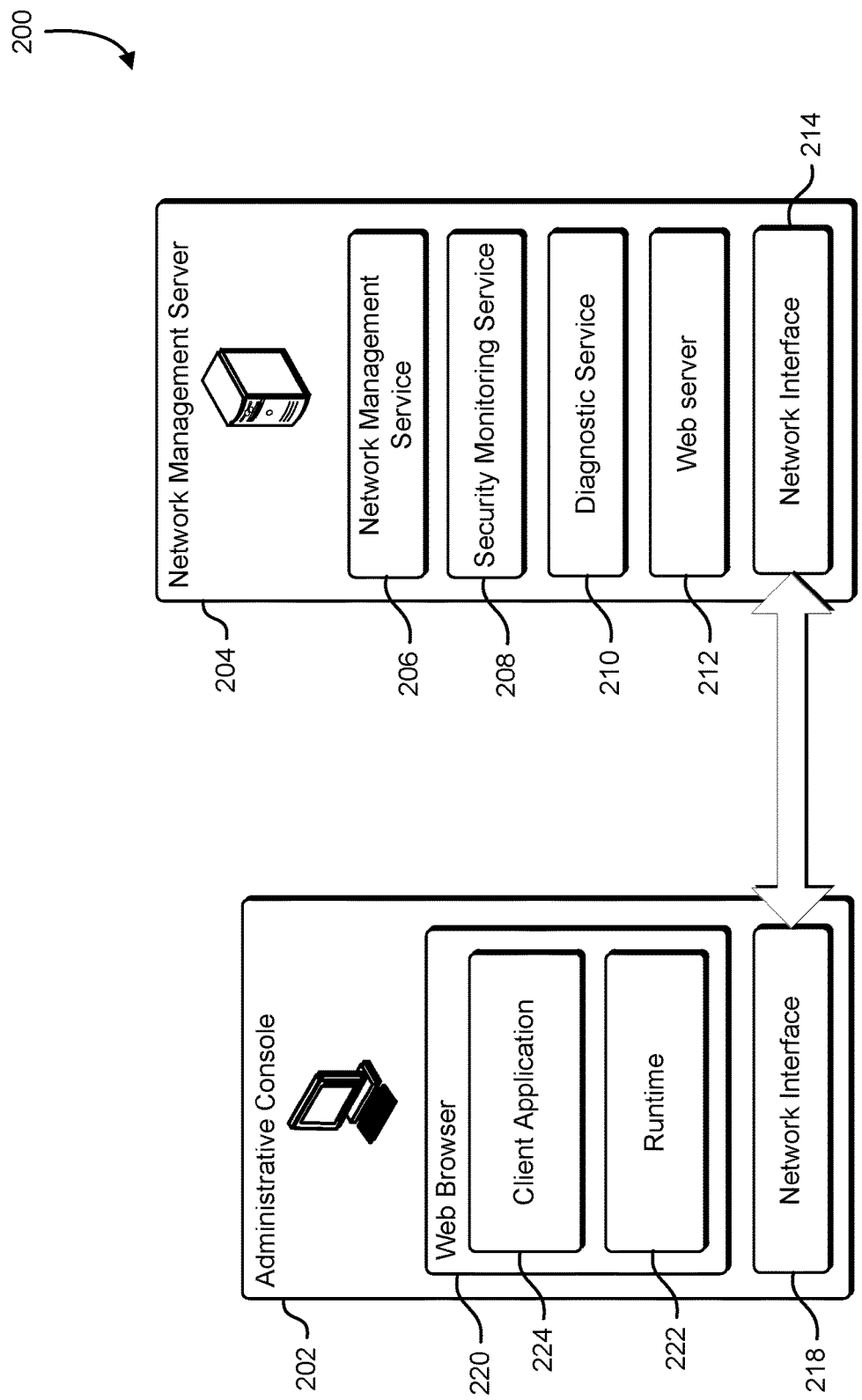
FIG. 2 shows an illustrative example of an administrative console that presents a graphical user interface to a network administrator using information provided by a network management server, in an embodiment.

FIG. 2 shows an illustrative example of an administrative console that presents a graphical user interface to a network administrator using information provided by a network management server, in an embodiment. A system 200 illustrates an embodiment in which an administrative console 202 displays information provided by a network management server 204. In one embodiment, the administrative console 202 may be the administrative console shown in FIG. 1 and described above.

The network management server 204 is a computer system, computer server, virtual server, server cluster, or application runtime environment that hosts a network management service 206. The network management service 206 is an application comprised of computer-executable instructions that, as a result of being executed by one or more processors of the network management server 204, cause the network management server 204 to implement the service. The network management service 206 acquires information that describes the topology, operation, and status of a network of computer systems. In some implementations, the network management service 206 receives status updates and information from various devices on the network of computer systems. In another implementation, the network management service 206 probes the network of computer systems by broadcasting queries over the network and uses the responses to construct a model that represents the network of computer systems in the memory of the network management server 204.

In various embodiments, the network management service 206 collects information regarding the network of computer systems from a number of monitoring services. In the example illustrated in FIG. 2, the network management service 206 receives information from a security monitoring service 208 and a diagnostic service 210. The security monitoring service 208 monitors the security of the network and reports security events to the network management service 206. Security events may include firewall events, data exfiltration events, denial of service events, intrusion detection events, credential change events, or cryptographic events. The diagnostic service 210 collects status events from network nodes. Status events may include client restart events, client login events, client configuration events, client crash events, or application status events.

The network management server 204 includes a Web server 212. The Web server 212 serves webpages, JavaScripts, and web applications to other computer systems via a network interface 214. In various examples, the network interface 214 is a physical or virtual network interface that allows the network management server 204 to communicate with other computer systems. The network interface 214 may be a wired or wireless interface such as an Ethernet interface, token Ring interface, Wi-Fi interface, cellular interface, radiofrequency interface, or infrared interface.

The network management service 206 processes the information collected from the network of computer systems and, in some embodiments, information from other services to produce a model of the network of computer systems. Status information may be added to the model. The network management service 206 generates hypertext markup language files, JavaScript files, and data files that are made available to other computer systems by the Web server 212.

An administrator may use the administrative console 202 to access the information assembled by the network management service 206. In an embodiment, the administrative console 202 is a client computer system, laptop computer system, cell phone, handheld device, tablet computer system, virtual computer system, or computing appliance. The administrative console 202 includes a network interface 218 that allows communication with the network management server 204. The network interface 218 may be an Ethernet interface, cellular interface, wireless interface, or other interface capable of communicating either directly or indirectly with the network interface of the network management server 204. The administrative console 202 hosts a web browser 220. The web browser 220 includes a runtime 222 that is capable of hosting and running web applications. The web browser 220 downloads a client application 224 from the network management server 204 by the Web server 212, and runs the client application 224 to produce a graphical user interface on a display of the administrative console 202. The graphical user interface displays information acquired by the network management service 206 in a human-readable format. Various examples of the user interface are described and shown in the following figures and description.

Figure 3:
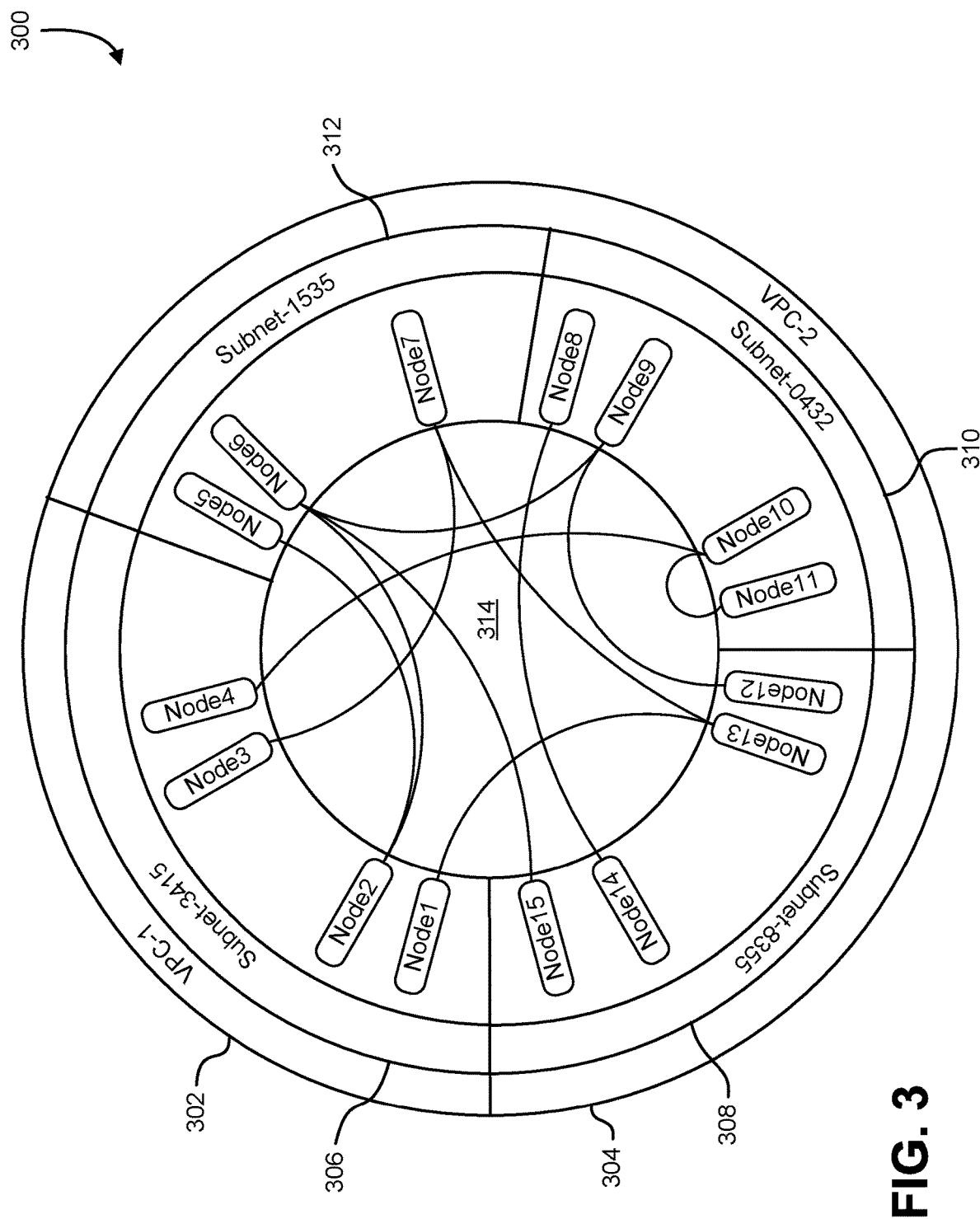
FIG. 3 shows an illustrative example of a user interface that represents a network of computer systems, in an embodiment.

FIG. 3 shows an illustrative example of a user interface 300 that represents a network of computer systems, in an embodiment. In some implementations, the user interface is generated and displayed by a browser using data provided by a server. In another implementation, the user interface is generated remotely on a server, transmitted to a client such as a web browser or other client application, and displayed by the client application on a display. In yet another implementation, the user interface is generated by a computer system and displayed on a display unit connected to the computer system. In the example illustrated in FIG. 3, the user interface 300 presents hierarchical network data and network connectivity data, but the user interface 300 may also be used to show hierarchical data and relational data generally. For example, the user interface 300 may be used to show database entries and properties. In another example, the user interface 300 may be used to show an organizational chart and workflows between individuals within an organization.

The user interface 300 includes a set of concentric circles. Space between the circles (rings) may be used to represent a particular level of the hierarchy. The outer ring corresponds to a VPC level of the network hierarchy. The outer ring includes a first segment 302 and a second segment 304. The first segment 302 represents a first VPC, and the second segment 304 represents a second VPC. The first segment 302 defines a first arc from the shared center of the concentric circles, and the second segment 304 defines a second arc from the shared center of the concentric circles.

The middle ring, in this example, corresponds to a subnet level of the network hierarchy. The middle ring includes a third segment 306, a fourth segment 308, a fifth segment 310, and sixth segment 312. The third segment 306 defines an arc that corresponds to the first arc of the first segment 302. The third segment 306 corresponds to a subnet "3415" which is associated with the first VPC. The fourth segment 308, the fifth segment 310, and the sixth segment 312, correspond to three subnets that are associated with the second VPC. The user interface illustrates this association by the combined arcs of the subnets corresponding to the arc of the associated VPC.

An inner ring corresponds to a device level for the network hierarchy. The inner ring includes a collection of tags that represent individual network nodes. For an individual network node, the node's location within the inner ring is within an arc defined by the subnet and VPC to which the individual node belongs. A shared interior region 314 illustrates nodes that are in communication with each other. In some embodiments, nodes are connected lines that represent the presence of network connectivity between the two nodes. In some examples, the lines may be colored, textured, or animated to represent various connection properties, protocol support, or connection states. For example, distinct colors may indicate an HTTP connections, FTP connections, and NFS connections. In another example, different line textures (such as dashed lines, dotted lines, and wavy lines) may be used illustrate slow serial connections, standard network connections, and high-speed fiber-optic connections. In yet another example, lines may be animated to indicate the direction of flow between two nodes.

In an embodiment, the user interface may be used to visualize hierarchical data associated with virtual machine instances and a customer account. For example, the user interface may illustrate VPCs belonging to a region, subnets belonging to a VPC, and instances belonging to a subnet. In another example, the interface may illustrate the connections between those instances and the public Internet.

Figure 4:
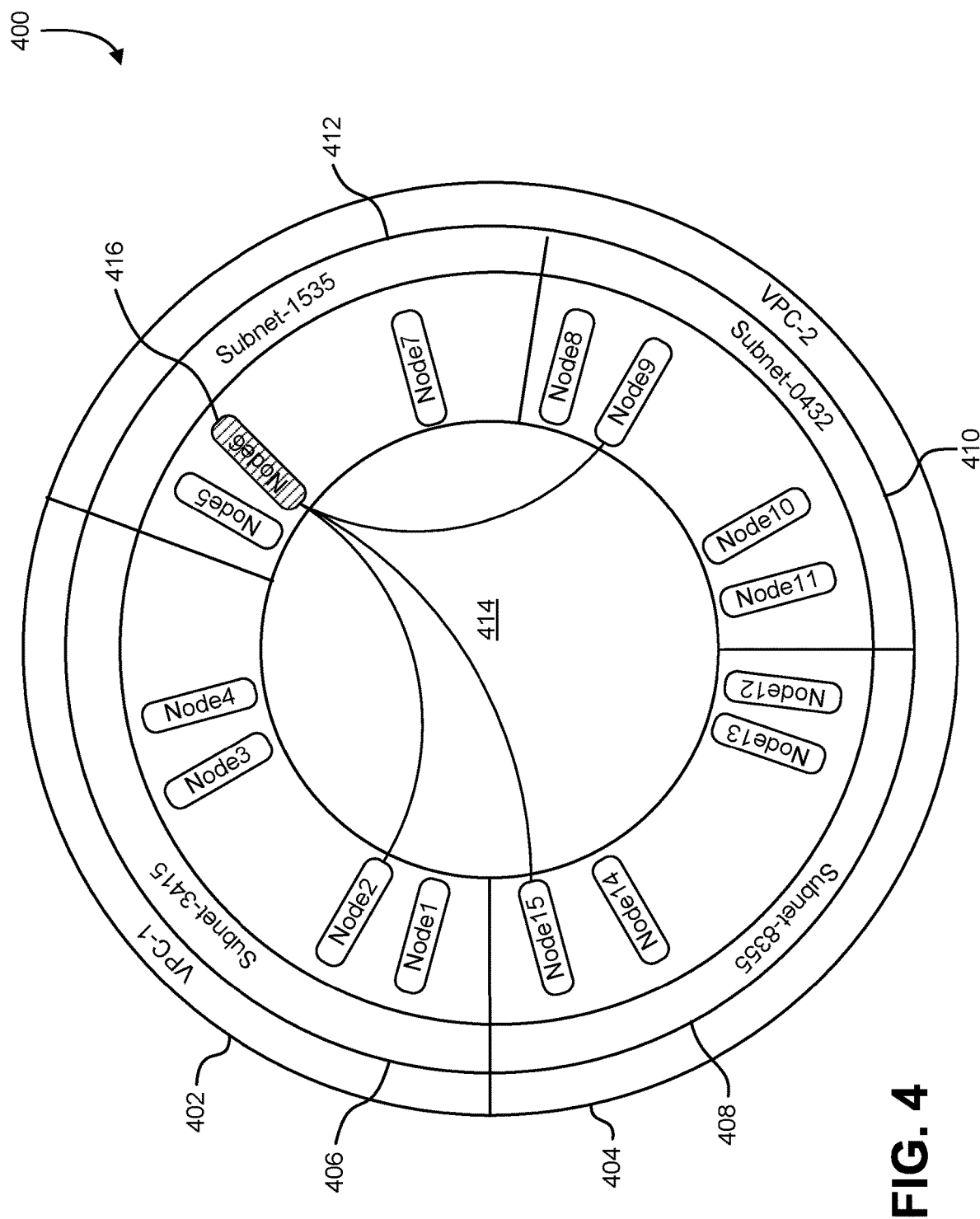
FIG. 4 shows an illustrative example of a user interface that represents connections between a selected node and other nodes in the network, in an embodiment.

FIG. 4 shows an illustrative example of a user interface 400 that represents connections between a selected node and other nodes in the network, in an embodiment. The user interface includes an outer ring that represents a VPC level of a network hierarchy, a middle ring that represents a subnet level of the network hierarchy, and an inner ring that represents a network node level of a network hierarchy. The outer ring includes a first segment 402 that represents a first VPC and a second segment 404 that represents a second VPC. The middle ring includes a third segment 406 that represents a first subnet associated with the first VPC. The middle ring includes a fourth segment 408, a fifth segment 410, and a sixth segment 412 that are associated with the second VPC. The inner ring includes a set of tags that represent individual network nodes. The tags are distributed around the inner ring in association with their associated subnet and VPC. Connections between individual network nodes are represented by corresponding lines that span a shared interior region 414 between the network node's respective tags.

In an embodiment, when a user selects a particular network device, the user interface 400 responds by highlighting the selected network device 416 and changing the connections displayed in the shared interior region 414 in accordance with the selected network device. A particular network device may be selected by selecting the tag associated with the device. For example, the user may click a button on a mouse while positioning a pointer over the tag to be selected. As a result of selecting a particular network device, a signal is transmitted to the application controlling the user interface, and the application causes the user interface to be modified. In one example, selecting a particular network device sends a signal to a JavaScript application running a web browser. In one implementation, the JavaScript application updates the user interface based on information accessible to the JavaScript application. In another implementation, the JavaScript application relays the information to a network management service which sends updated information to be displayed on the user interface.

In an embodiment, selecting a particular network device causes the administrative console to remove network connection indications that are not associated with the selected network device. In another embodiment, selecting a particular network device highlights the connections to and from the selected device so that they can be easily distinguished from the remaining network connections displayed in the shared interior region 414. In another embodiment, selecting a particular network device limits the displayed connections to connections to and from the selected device and to connections to and from devices that are directly connected to the selected device. In an embodiment, the network administrator may select a plurality of network devices in the user interface, and the displayed connections are limited to connections to and from the selected plurality of network devices. By allowing the network administrator to select particular devices of interest, the number of displayed connections is reduced, thereby improving the clarity with which individual paths can be discerned.

Figure 5:
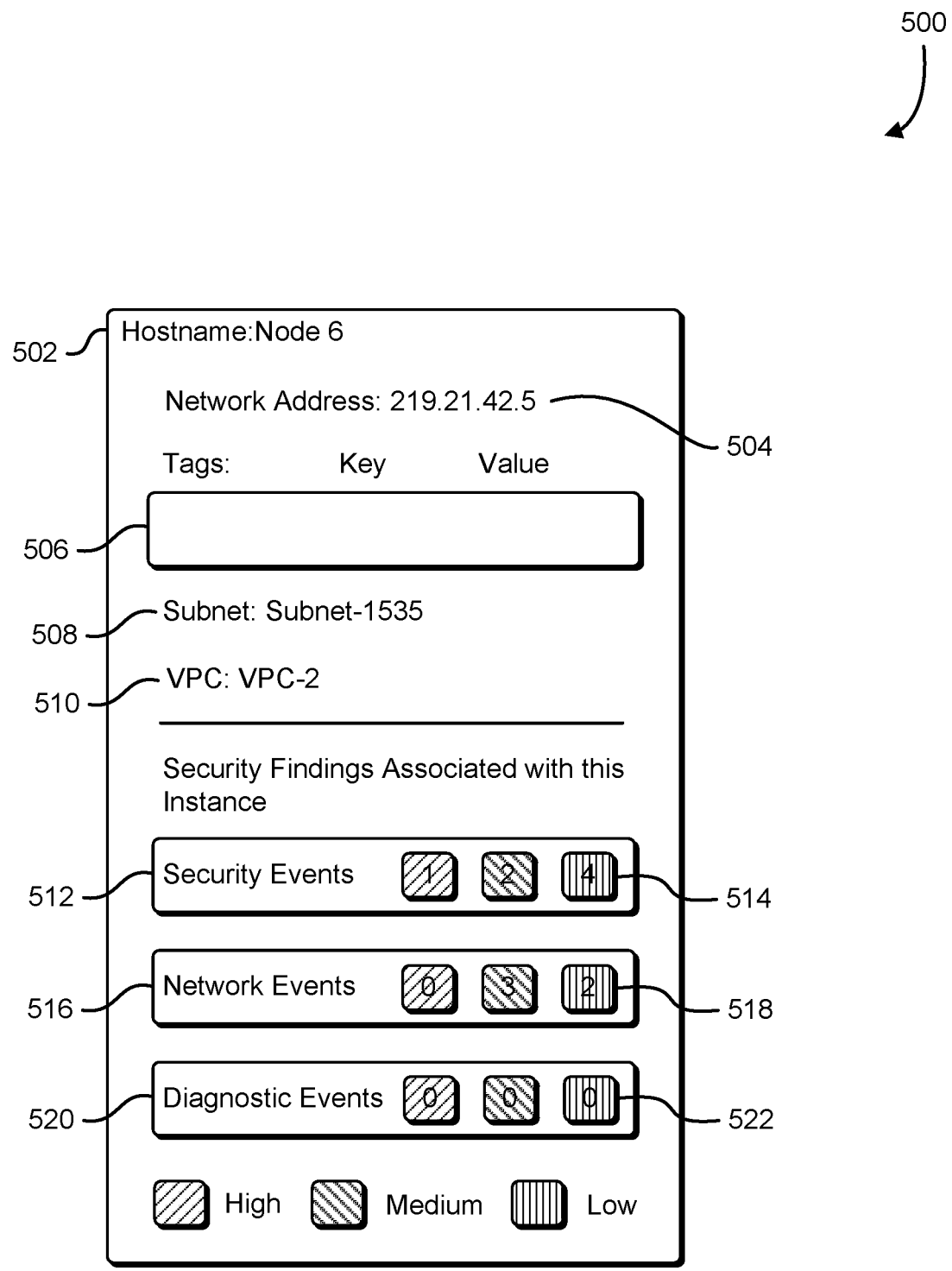
FIG. 5 shows an illustrative example of a dialog box that presents information associated with a selected node, in an embodiment.

FIG. 5 shows an illustrative example of a dialog box that presents information associated with a selected node, in an embodiment. A diagram 500 illustrates an example of a dialog box 502. In various embodiments, the dialog box 502 is displayed as a result of a network administrator selecting a particular network node in the user interface illustrated in FIG. 4. In some examples, multiple instances of the dialog box 502 may be displayed as a result of the network administrator selecting a corresponding number of network nodes in the user interface. The dialog box 502 includes a header at the top of the dialog box which recites the hostname of the network node. In some examples, the hostname is an IP hostname. In various embodiments, the dialog box 502 displays network address information 504. In various examples, the network address information 504 may be a media access control ("MAC") address, IP address, token Ring address, USB address or email address.

The dialog box 502 displays information relating to tags that are associated with the network node. Each network node may be associated with one or more tags, and each tag may include a key and a value. In some examples, the dialog box displays the name, key, and value of each tag associated with the selected network node. The user interface may include a text entry control 506 or a selection control that allows the network administrator to select one or more tags. In one implementation, a text entry control allows the administrator to enter a regular expression to identify the one or more tags. In another implementation, a text drop down control allows the administrator to select from a set of tags that are present in those network nodes that are displayed in the user interface. When the network administrator selects one or more tags, the set of network nodes displayed in the user interface may be limited to those nodes that include the tag. In some implementations, the network administrator may further specify particular keys and values of the selected tags, thereby allowing for further refinement in the set of nodes displayed.

The dialog box 502 displays subnet information 508 and VPC information 510 that are associated with the selected network node. The subnet information 508 may be displayed as a subnet name, a subnet mask, or a network address range. The VPC information 510 may be displayed as a VPC name, a network name, or a network address range.

In some examples, the dialog box 502 includes a number of visual elements that display security findings, diagnostic findings, or other information. In the example illustrated in FIG. 5, the dialog box 502 includes a security event display 512. The security event display 512 includes a set of status indicators 514. The set of status indicators 514 indicates a count of security events. In some examples, the set of status indicators 514 indicates a count of medium, low, and high priority security events. In some implementations, the security event display 512 is selectable by the administrator. In such implementations, selecting the security event display 512 causes the user interface to present additional detail associated with the security events. In some examples, the administrator may select a particular priority by selecting a particular element of the set of status indicators 514, and in response, the user interface presents additional detail for security events of the selected priority.

The dialog box 502 includes a network event display 516. The network event display 516 includes a set of status indicators 518. Each status indicator in the set of status indicators 518 indicates a count of network events. In some examples, the set of status indicators 518 displays a count of medium, low, and high priority network events. In some implementations, the network event display 516 is selectable by the administrator. In such implementations, selecting the network event display 516 causes the user interface to present additional detail associated with the network events. In some examples, the administrator may select a particular priority by selecting a particular element of the set of status indicators 518, and in response, the user interface presents additional detail for network events of the selected priority.

The dialog box 502 includes a diagnostic event display 520. Diagnostic events may include events provided by applications, hardware monitoring services, or log-entry management services. The diagnostic event display 520 includes a set of status indicators 522. Each status indicator in the set of status indicators 522 indicates a count of diagnostic events. In some examples, the set of status indicators 522 indicates a count of medium, low, and high priority diagnostic events. In some implementations, the diagnostic event display 520 is selectable by the administrator. In such implementations, selecting the diagnostic event display 520 causes the user interface to present additional detail associated with the diagnostic events. In some examples, the administrator may select a particular priority by selecting a particular element of the set of status indicators 522 and, in response, the user interface presents additional detail for diagnostic events of the selected priority.

Figure 6:
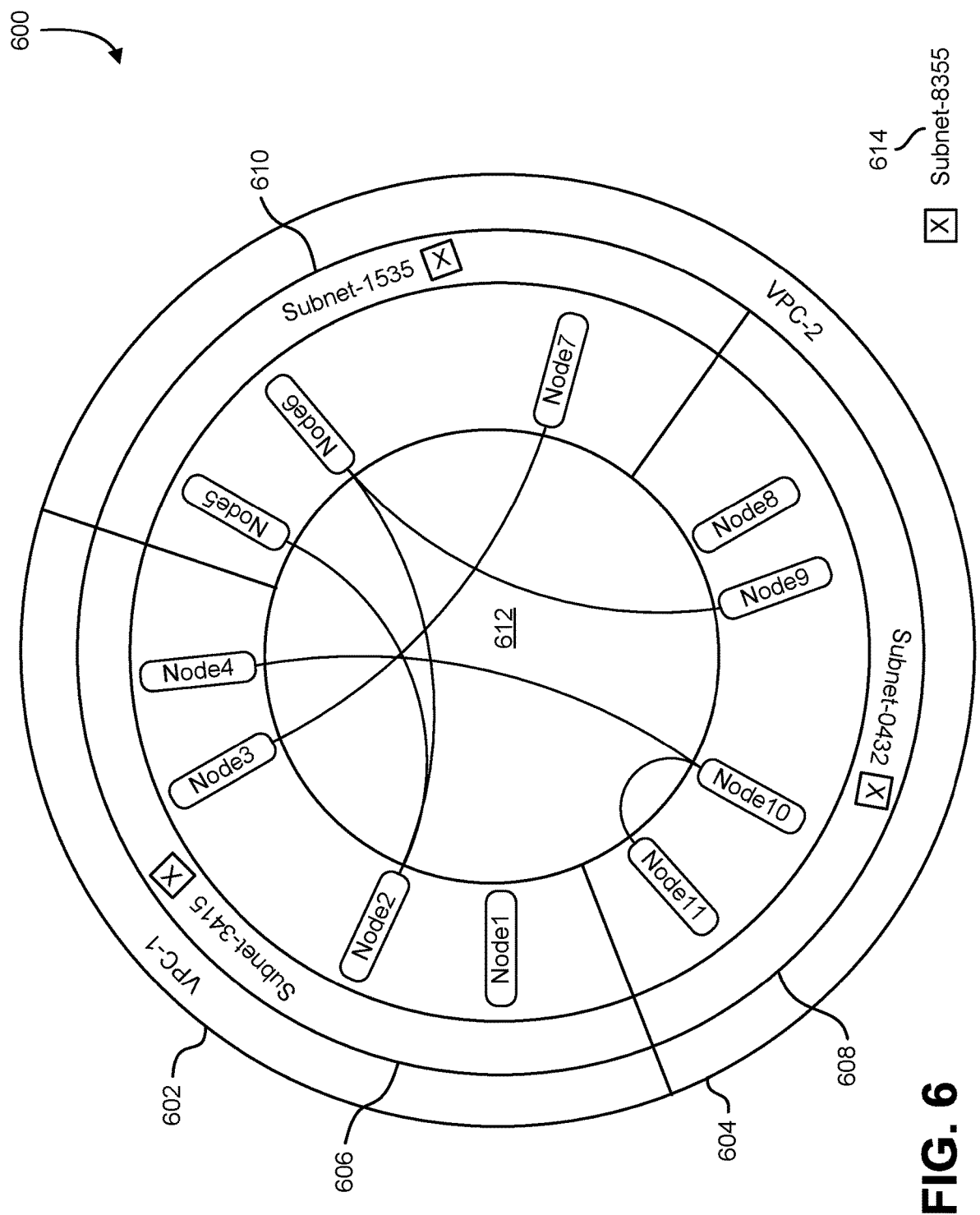
FIG. 6 shows an illustrative example of a user interface that allows the user to select subnets of a computer network for display, in an embodiment.

FIG. 6 shows an illustrative example of a user interface 600 that allows the user to select subnets of a computer network for display, in an embodiment. The user interface 600 includes an outer ring that represents a VPC level of a network hierarchy, a middle ring that represents a subnet level of the network hierarchy, and an inner ring that represents a network node level of a network hierarchy. The outer ring includes a first segment 602 that represents a first VPC and a second segment 604 that represents a second VPC. The middle ring includes a third segment 606 that represents a first subnet associated with the first VPC. The middle ring includes a fourth segment 608, and a fifth segment 610, that are associated with the second VPC. The inner ring includes a set of tags that represent individual network nodes. The tags are distributed around the inner ring in association with their associated subnet and VPC. Connections between individual network nodes are represented by corresponding lines that span a shared interior region 612 between the network node's respective tags.

In some examples, the network administrator is able to select an interface element associated with a subnet to remove network nodes associated with the selected subnet from the display. In some implementations, subnets that are removed from the display are placed in a holding area 614, from which they may be reselected and restored to the display. In the example shown in FIG. 6, a subnet identified as '8355' has been selected and removed from the display (shown in FIG. 3). A corresponding subnet has been added to the holding area 614. Network nodes associated with the subnet have been removed from the display, and the remaining network nodes and subnets have been redistributed around the circumference to consume the available space. If the administrator selects the subnet from the holding area 614, the subnet will be re-added to the display and the existing network nodes will be compressed to make room for the additional network nodes and subnet. In this way, an administrator may adjust the amount of information shown to focus on particular network nodes, connections, or subnets of interest.

In some examples, the user interface allows the administrator to set focus on a particular displayed subnet. When the administrator sets the focus on a particular displayed subnet, connections to and from network nodes in the selected subnet are displayed across the shared interior region 612 and other connections are removed from the shared interior region 612. In various implementations, setting the focus may be accomplished by control clicking, or by selecting a stateful user interface element associated with each subnet.

Figure 7:
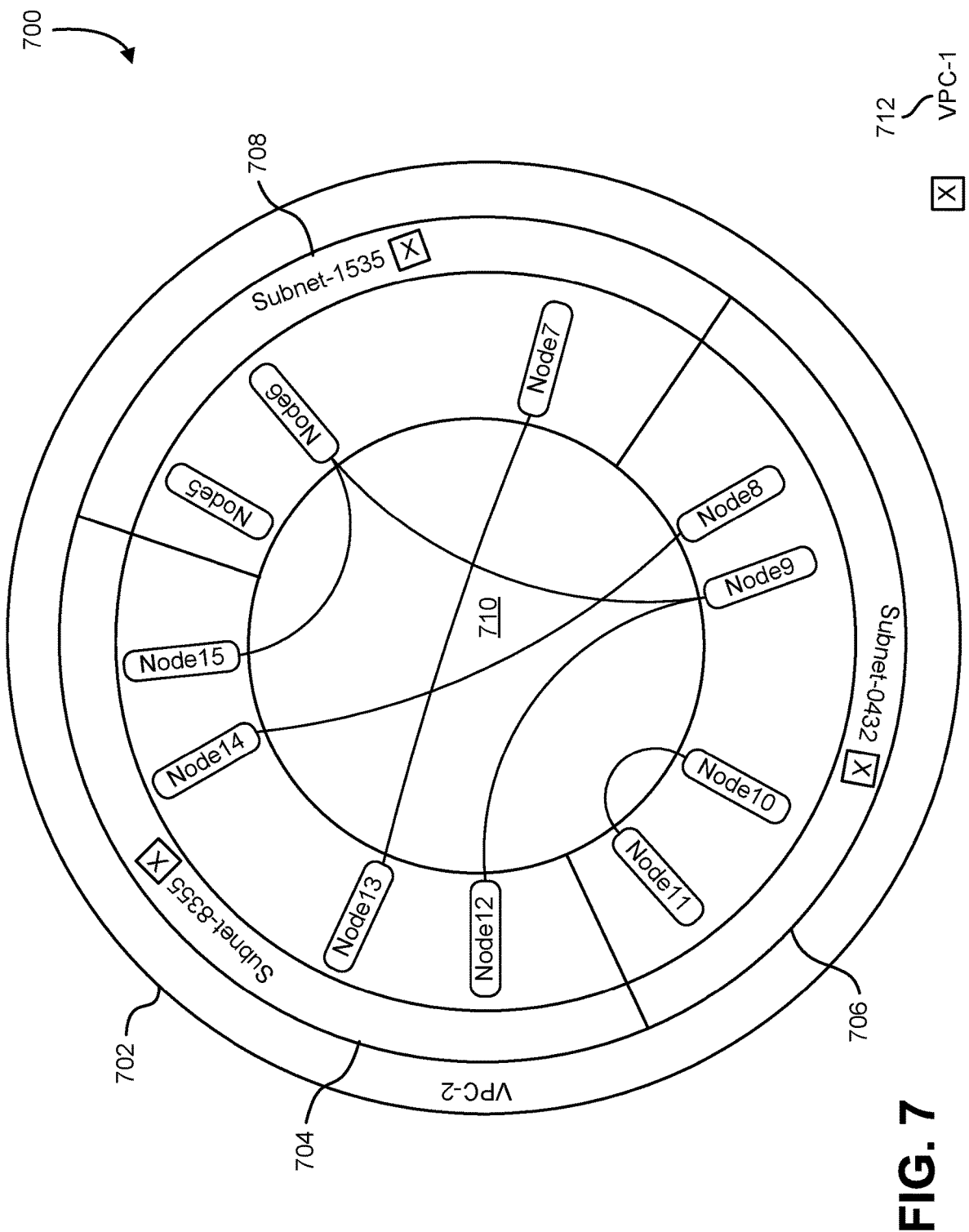
FIG. 7 shows an illustrative example of a user interface that allows the user to select a set of networks for display, in an embodiment.

FIG. 7 shows an illustrative example of a user interface that allows the user to select a set of networks for display, in an embodiment. The user interface 700 includes an outer ring that represents a VPC level of a network hierarchy, a middle ring that represents a subnet level of the network hierarchy, and an inner ring that represents a network node level of a network hierarchy. The outer ring includes a first segment 702 that represents a first VPC. The middle ring includes a second segment 704, a third segment 706, and a fourth segment 708, that represent a first subnet, a second subnet, and a third subnet respectively that are associated with the first VPC. The inner ring includes a set of tags that represent individual network nodes. The tags are distributed around the inner ring in association with their respective subnets and VPCs. Connections between individual network nodes are represented by lines that span a shared interior region 710 between the network node's respective tags.

In some examples, the network administrator is able to select an interface element associated with a VPC to remove network nodes associated with the selected VPC from the display. In some implementations, VPCs that are removed from the display are placed in a holding area 712, from which they may be reselected and restored to the display. In the example shown in FIG. 7, a VPC identified as 'VPC-1' has been selected and removed from the display (compare to the user interface of FIG. 3). A corresponding VPC has been added to the holding area 712. Network nodes associated with the VPC have been removed from the display, and the remaining network nodes, subnets, and VPCs have been redistributed around the circumference to consume the available space. If the administrator selects the VPC from the holding area 712, the VPC will be added to the display and the existing network nodes and subnets in the display will be moved to make room for the additional network nodes, subnet, and VPC. In this way, an administrator may adjust the amount of information shown to focus on particular VPCs of interest.

Figure 8:
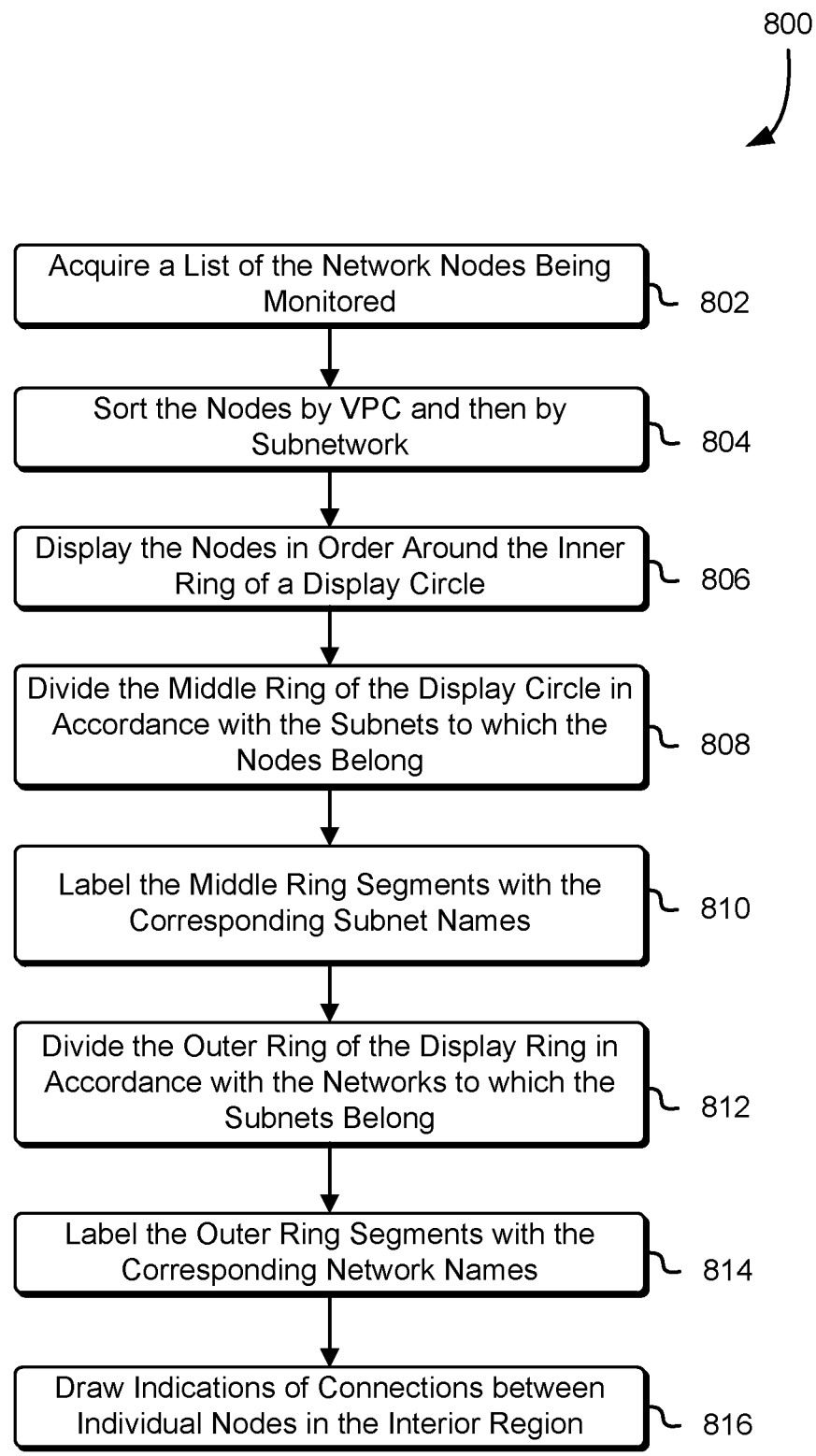
FIG. 8 shows an illustrative example of a process that, as a result of being performed by an administrative console, generates a user interface that displays the state of a network of computer systems.

FIG. 8 shows an illustrative example of a process that, as a result of being performed by an administrative console, generates a user interface that displays the state of a network of computer systems. A flowchart 800 illustrates a process that begins at block 802 with an administrative console acquiring a list of network nodes being monitored. In some examples, the list of network nodes is acquired from a network monitoring server. In another example, the list of network nodes is acquired by broadcasting a discovery message across the computer network and then assembling the list of network nodes based at least in part on the responses received.

At block 804, the administrative console sorts the list of network nodes by network or VPC, and then by subnet to which each individual network node belongs. At block 806, the administrative console draws the concentric shapes that frame the user interface and creates a tag for each individual network node within the inside ring of the concentric shapes. The tags are placed around the ring in their sorted order so that tags associated with a particular subnet are grouped together, and tags associated with a particular network or VPC are grouped together. At block 808, the administrative console segments the middle ring of the interface based on the position of the tags in the inner ring by placing dividing lines on the arcs associated with groups of tags that share a common subnet. The resulting arc segments are labeled subnet names or address ranges at block 810.

At block 812, the administrative console divides the outer display ring in accordance with the arcs formed by groups of tags that share a common VPC or subnet. The resulting arc segments in the outer ring are labeled with the corresponding VPC names or address ranges at block 814.

At block 816, the administrative console adds indications of connections between pairs of network nodes. In an embodiment, the indications are lines. The lines may be textured, colored, or drawn with differing weights to indicate various properties of the associated connection. In various examples, properties of a connection may include transmission speed, bandwidth, protocol support, load percentage, physical connection type, connection status, level of encryption, or level of activity.

The present document describes a user interface constructed using concentric circles and arc segments; however, the concepts described herein may be used to construct other interfaces based on other geometric constructions. For example, the concentric circles may be replaced with ovals, polygons, or even nonmatching shapes. In addition, the shapes need not be perfectly concentric but only need share some shared interior region through which connections may be illustrated between individual data elements.

The present document describes the user interface in the context of displaying networking information, but the interface is equally applicable to other situations involving the display of hierarchical and/or relational data such as relational databases, organizational structures, or social networks.

Figure 9:
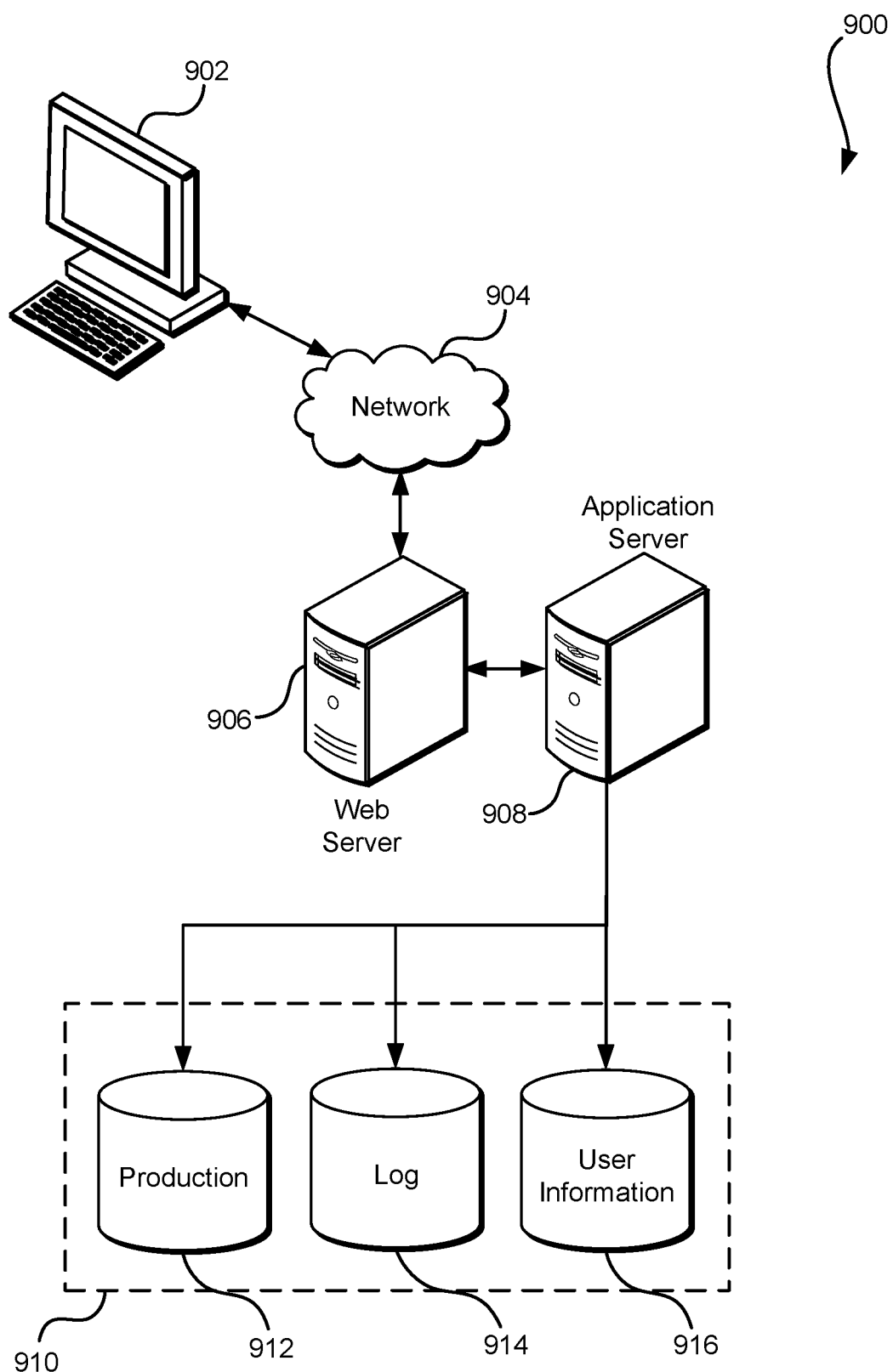
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The short-range communication channel may be established using various technologies, such as induction wireless, infrared wireless (such as technologies operating according to specifications and protocols provided by the Infrared Data Association, or IrDA) or ultra wideband formats. In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Unless otherwise stated or clear from context, the phrase "based on" is not intended to mean "based solely on," so that if one thing is "based on" another, that thing may additionally be based on other things as well.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
  acquiring a set of hierarchical data;
  generating a user interface representing the set of hierarchical data, wherein the user interface includes:
    a set of substantially concentric shapes that enclose a shared interior region, individual regions between pairs of the shapes corresponding to individual hierarchical levels of the set of hierarchical data;
    first information associated with a first level of a hierarchy of the set of hierarchical data presented in association with an arc segment of a first region of the individual regions, the first information describing a computer network;

second information associated with a second level of the hierarchy presented in association with the arc segment of a second region of the individual regions inside the first region, the second information describing a portion of the computer network, the second information associated with the first information;

a subset of the set of hierarchical data that is associated with the first information presented in association with the arc segment of a third region of the individual regions inside the second region; and a connection between two data elements in the set of hierarchical data presented as a line between the two data elements across the shared interior region, individual data elements of the set of hierarchical data representing individual network nodes;

determining that an arc segment of a region is selected by a user;

removing information associated with the selected arc segment from the user interface; and removing data elements associated with the selected arc segment from the user interface.

2. The computer-implemented method of claim 1, wherein:

the second information describes a computer subnet.

3. The computer-implemented method of claim 2, wherein:

a visually discernible characteristic of the line indicates a particular type of network connectivity supported between the two data elements.

4. The computer-implemented method of claim 1, further comprising:

acquiring information indicating selection of a subset of the set of hierarchical data; and displaying the subset of the hierarchical data in the user interface.

5. A system, comprising:

one or more processors;

memory that stores computer-executable instructions that, if executed by the one or more processors, cause the system to generate a user interface representing a set of hierarchical data, wherein the user interface includes:

a set of shapes that enclose a shared interior region, individual regions between pairs of the shapes representing individual hierarchical levels of the set of hierarchical data;

first information associated with a first level of a hierarchy of the set of hierarchical data presented in association with a portion of a first region of the individual regions, the first information describing a computer network;

second information associated with a second level of the hierarchy presented in association with a portion of a second region of the individual regions inside the first region, the second information describing a portion of the computer network, the second information associated with the first information;

a subset of the set of hierarchical data that is associated with the first information presented in association with the portion of a third region of the individual regions inside the second region; and a connection between two data elements in the set of hierarchical data is represented by an indication of an association between the two data elements in the shared interior region, individual data elements of the set of hierarchical data representing individual network nodes;

determining that at least one of the portions of at least one of the regions is selected by a user;

removing information associated with the selected portion from the user interface; and removing data elements associated with the selected portion from the user interface.

6. The system of claim 5, wherein the portion of the first region is an arc segment of the first region, the arc segment having a pivot in the shared interior region.

7. The system of claim 5, wherein:

the set of shapes is a set of concentric circles; and the first region, the second region, and the third region are concentric rings.

8. The system of claim 5, wherein the computer-executable instructions, if executed by the one or more processors, cause the system to further:

determine that a data element is selected by a user; and display a dialog that includes information associated with the data element.

9. The system of claim 5, wherein the computer-executable instructions, if executed by the one or more processors, cause the system to further:

determine that the portion of the second region is selected by a user;

remove the second information from the user interface; and remove data elements associated with the portion of the second region from the user interface.

10. The system of claim 5, wherein the computer-executable instructions, if executed by the one or more processors, cause the system to further:

determine that the portion of the first region is selected by a user;

remove the first information from the user interface;

remove the second information associated with the first information from the user interface; and remove data elements associated with the portion of the first region from the user interface.

11. The system of claim 5, wherein:

the connection between two data elements is represented by a line; and a visually discernable characteristic of the line indicates a particular type of network connectivity between the two data elements.

12. The system of claim 5, wherein:

the second region represents a subnet.

13. A non-transitory computer-readable storage medium having stored thereon executable instructions that, as a result of being executed by one or more processors of a computer system, cause the computer system to at least generate a user interface representing a set of hierarchical data that describes a computer network, wherein the user interface includes:

a set of shapes that enclose a shared interior region, individual regions between pairs of the shapes representing individual hierarchical levels of the set of hierarchical data, the individual regions between the pairs of shapes representing hierarchical levels of the computer network;

information associated with a first level of a hierarchy of the set of hierarchical data presented in association with a first portion of a first region of the individual regions;

a subset of the set of hierarchical data that is associated with the information presented in association with a second portion of a second region of the individual regions, the second portion associated with the first portion;

a connection between two data elements in the set of hierarchical data presented as a path indication between the two data elements across the shared interior region;

individual data elements of the set of hierarchical data that represent individual network nodes of the computer network; and wherein as a result of determining that at least one of the portions of at least one of the regions is selected by a user, information and one or more data elements associated with the selected portion are removed from the user interface.

14. The non-transitory computer-readable storage medium of claim 13, wherein the executable instructions further comprise instructions that, as a result of being executed by the one or more processors, cause the computer system to:

determine that a data element has been selected; and remove paths that are not associated with the data element from the shared interior region.

15. The non-transitory computer-readable storage medium of claim 13, wherein the executable instructions further comprise instructions that, as a result of being executed by the one or more processors, cause the computer system to:

determine that a user has selected the first portion of the first region; and disassociate the information associated with the first level of the hierarchy from the first portion of the first region.

16. The non-transitory computer-readable storage medium of claim 15, wherein the executable instructions further include instructions that cause the computer system to:

display the information associated with the first level of the hierarchy and a selection control that, as a result of being selected by the user, re-associates the information associated with the first level of the hierarchy with the first portion of the first region.

17. The non-transitory computer-readable storage medium of claim 13, wherein the executable instructions are JavaScript instructions that are downloaded into a web browser and executed to generate the user interface.

18. The non-transitory computer-readable storage medium of claim 13, wherein the path indication includes a texture that indicates a property of the connection.

19. The non-transitory computer-readable storage medium of claim 13, wherein the path indication includes a color that indicates a communication protocol supported by the connection.

20. The non-transitory computer-readable storage medium of claim 13, wherein the path indication is a path animation.

* * * * *